(12) United States Patent
Li et al.

(10) Patent No.: US 6,760,181 B2
(45) Date of Patent: Jul. 6, 2004

(54) MICROACTUATOR FOR DYNAMIC CONTROLLING HEAD-MEDIA INTERACTION AND FLY-HEIGHT

(75) Inventors: Shaoping Li, Naperville, IL (US); Charles Potter, Bloomington, MN (US); Wenzhong Zhu, Richfield, MN (US); Tom Rasmussen, Kasson, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 298 days.

(21) Appl. No.: 10/021,158

(22) Filed: Dec. 13, 2001

(65) Prior Publication Data

US 2002/0105750 A1 Aug. 8, 2002

Related U.S. Application Data

(60) Provisional application No. 60/256,223, filed on Dec. 15, 2000.

(51) Int. Cl.[7] .............................................. G11B 21/02
(52) U.S. Cl. ....................................................... 360/75
(58) Field of Search ........................... 360/75, 71, 101, 360/234.7, 235.1, 245.5, 294.4; 72/342.1; 216/22; 310/321

(56) References Cited

U.S. PATENT DOCUMENTS

| | | | |
|---|---|---|---|
| 4,605,977 A | 8/1986 | Matthews | 360/103 |
| 4,853,810 A | 8/1989 | Pohl et al. | 360/103 |
| 5,021,906 A | 6/1991 | Chang et al. | 360/103 |
| 5,198,945 A | 3/1993 | Blaeser et al. | 360/104 |
| 5,297,413 A | 3/1994 | Schones et al. | 72/342.1 |
| 5,624,581 A | 4/1997 | Ihrke et al. | 216/22 |
| 5,719,720 A | 2/1998 | Lee | 360/71 |
| 5,929,326 A * | 7/1999 | Imaino et al. | 73/105 |
| 5,991,113 A | 11/1999 | Meyer et al. | 360/75 |
| 5,991,114 A * | 11/1999 | Huang et al. | 360/75 |
| 6,118,637 A | 9/2000 | Wright et al. | 360/294.4 |
| 6,166,874 A | 12/2000 | Kim | 360/75 |
| 6,222,302 B1 | 4/2001 | Imada et al. | 310/321 |
| 6,590,748 B2 | 7/2003 | Murphy et al. | 360/294.4 |
| 6,597,539 B1 * | 7/2003 | Stupp et al. | 360/245.7 |
| 2003/0074783 A1 * | 4/2003 | Boismier et al. | 29/603.03 |

OTHER PUBLICATIONS

C.E. Yeack–Scranton, Novel Piezoelectric Transducers to Monitor Head–Disk Interactions, *IEEE Transactions on Magnetics*, vol. Mag–22, No. 5, Sep. 1986, pp. 1011–1016.
C.E. Yeack–Scranton, An Active Slider for Practical Contact Recording, *IEEE Transactions on Magnetics*, vol. 26, No. 5, Sep. 1990, pp. 2478–2483.

* cited by examiner

*Primary Examiner*—David Hudspeth
*Assistant Examiner*—Mitchell Slavitt
(74) *Attorney, Agent, or Firm*—Kinney & Lange, P.A.

(57) ABSTRACT

A microactuating suspension assembly used for a disc drive is disclosed. The microactuating suspension assembly has a suspension load beam and a microactuator placed on the suspension load beam for bending the suspension load beam at the front end thereof during a sustained period of data read/write time and thus achieving a desired average fly-height which is different from an unaltered average fly-height which would have been achieved without the microactuator. In particular, the microactuating suspension assembly can be used to achieve a very low fly-height. Additionally, very large bandwidth and very short seeking time is made possible when a bimorph piezoelectric microactuator is used.

20 Claims, 7 Drawing Sheets

MICROACTUATOR FOR DYNAMIC CONTROLLING HEAD-MEDIA INTERACTION AND FLY-HEIGHT

CROSS-REFERENCE TO RELATED APPLICATION(S)

This application claims priority from Provisional Application No. 60/256,223 filed Dec. 15, 2000 for "Piezoelectric Bimorph Microactuator for Dynamic Controlling Head-Media Interaction and Fly-Height" by Shaoping Li, Charles Potter, Wenzhong Zhu, and Tom Rasmussen.

BACKGROUND OF THE INVENTION

The present invention relates to an actuating suspension assembly in a disc drive, such as a hard drive using a magnetic storage medium. More particularly, the present invention relates to a disc drive microactuator such as a high resolution positioning mechanism using two-stage actuation for achieving and maintaining a low transducer portion of a slider with respect to circumferential data tracks of a rotatable disc.

As the areal density of concentric data tracks on magnetic discs continues to increase (that is, the size of data tracks and radial spacing between data tracks decrease), more precise head positioning is required. Head positioning in a disc drive includes two distinct but related aspects: tracking control (i.e., radial positioning of the head) and fly-height control (i.e., head-media spacing). Although both aspects are important considerations in disc drives in the future, the present invention mainly relates to fly-height control.

Compared to the tracking control, controlling of the height at which the head slider is floating (i.e., fly-height control) is a separate but related problem. Fly-height control itself also has two distinct but related aspects: 1) achieving a desired low fly-height during disc rotation and 2) keeping the fly-height as close as possible to a constant during disc rotation. The first aspect relates to the capability to achieve a sustainable average low fly-height while the second aspect relates to the stability of the fly-height during disc rotation regardless of the average fly-height. These two aspects are further explained as follows.

Increasingly higher areal density of data tracks in the modern disc drives requires that, in addition to having direct impact on radial positioning resolution, the fly-height be decreased in order to obtain higher signal resolution. That is, there is a pressing need for the air-bearing surface of a slider to fly as close to the media as possible, without touching the media to produce better resolution of data on the media, because read/write signal amplitude is dependent on the distance between the magnetic medium and the read/write head, and close spacing drastically improves transducer performance without having to improve sensitivity of the transducer.

Fly-height is determined by the dynamics of air bearing in modern disc drives which use a head suspension to support the magnetic read/write heads in close proximity to the rotating magnetic discs. The well known and widely used Watrous-type suspensions such as that disclosed in the U.S. Pat. No. 5,198,945 to Blaeser et al. include a load beam having a mounting region or base plate at a proximal end, a flexure on a distal end, a relatively rigid region adjacent to the flexure and a spring region between the base plate and rigid region. An air-bearing slider which includes the magnetic head is mounted to the flexure. During operation of the disc drive, typically the slider does not touch the rotating disc. Rather, the force of the air rotating with the disc causes the slider to fly at a microscopic distance known as the fly-height above the disc. A gram load force applied on the suspension urges the slider toward the disc to counteract the slider-generated air-bearing forces and maintain the proper fly height. During the rotation of the disc, the actual fly-height is determined by the air bearing design and the amount of gram load applied.

The schemes used in conventional hard drives to lower the fly-height primarily address air bearing designs. However, this approach is reaching the limit of its ability to meet the ever decreasing fly-height requirement and the accompanying need to control disturbances present in the hard drive environment.

Given an air bearing design, the average fly-height can potentially be adjusted by varying the amount of gram load applied on the suspension. In conventional hard drives, the gram load is established during the manufacturing of the hard drives. That is, each hard drive as a final product has a predetermined pre-load on the suspension load beam. Techniques for adjusting suspension gram loads during manufacturing are well known and disclosed. For example, the Schones et al. U.S. Pat. No. 5,297,413 discloses a machine capable of quickly adjusting loads on head gimbal assemblies and/or suspension assemblies so as to bring the loads within a desired specification window defined by upper and lower window specifications. The load adjusting machine includes a load cell, a mechanical bending mechanism and a heat source, all of which are coupled to and controlled by a computer. During the load adjusting process, the machine bends the suspension assembly load beams to increase and decrease loads. The process is complete when the load is within the desired specification. The bending of the suspension load beams is permanently retained. Following the manufacture and gram load adjustment of the suspensions, the sliders are bonded to the flexures, typically in a manual operation, to form head suspension assemblies. The head suspension assemblies are in turn mounted to actuator arms extending from a rotating actuator shaft to form a head stack assembly. The head stack assembly is then mounted with respect to a stack of magnetic discs, with the suspensions extending between the discs.

Given the air bearing mechanism used and the gram load applied, the average fly height of a disc drive is largely determined. Since the gram load in a conventional hard drive are is mechanically predetermined during manufacturing, the average fly-height is also mechanically predetermined.

Compared to meeting the demand for ever decreasing average fly height, maintaining a constant fly height during the operation of a disc drive is a related but different problem. As the fly-height of the head decreases, fluctuation, vibration, roughness of the disc surface and thermal effects start to play an increasingly important role, creating a more stringent requirement for fly-height stability.

In addition to random fluctuations such as that caused by mechanical or thermal noise, it is known that the air flow, which causes the slider to float, increases as the head is moved from the inner to the outer circumference of the disc. This also causes the fly height to change. In this disclosure, the phrase "environmental fluctuation" is used to include every possible type of fly-height fluctuations caused by environmental factors other than a change of gram load on the suspension load beam.

A stabilizing device is thus required in order to keep the fly-height constant as the system experiences environmental fluctuations such as mechanical and thermal noise, or the radial positioning the head slider above the disc surface changes.

Various methods existing in the prior art for controlling transducer head fly-height. For example, it is known to address the head-media spacing loss due to thermal expansion of the transducer by optimizing the thermal mechanical structure and properties of the transducer. Such a method is in essence a passive countermeasure and fails to actively adjust the pole tip position of the transducer to consistently minimize its impact on head-media spacing.

Several patents discuss the use of piezoelectric material in a slider, to adjust the position of a transducer mounted to the slider. For example, U.S. Pat. No. 5,021,906 (Chang et al.) discloses a programmable air bearing slider with a deformable piezoelectric central region between leading edge and trailing edge regions. The deformable region is controlled electrically to change the angle between the leading and trailing regions, thus to change the position of a transducer mounted to the trailing region.

U.S. Pat. No. 4,853,810 (Pohl et al.) discloses a magnetic transducing head including a body and a piezoelectric layer adjacent the body. The piezoelectric layer is operable to control the head/disc gap, based on sensing a tunnel current across the gap between the recording surface and a tunnel electrode on the slider.

U.S. Pat. No. 5,991,113 (Meyers et al.) discloses a transducer movable toward and away from the air bearing surface responsive to changes in the slider operating temperature. The transducer movement is either due to a difference in thermal expansion coefficients between a transducing region of the slider incorporating the transducer and the remainder of the slider body, or by virtue of a strip of thermally expansive material incorporated into the slider near the transducer to contribute to the displacement by its own expansion.

It has also been suggested in the prior art publications that a piezoelectric microactuator may be used to actively control fly-height. See C. E. Yeack-Scranton, IEEE Trans Magn, MAG-22 (1986), p2763 and C. E. Yeack-Scranton, et al., IEEE Trans Magn., MAG-26 (1990), p2478. The suggested schemes are based on piezoelectric strain actuators which have drawbacks including processing difficulties, compatibility problems, structure complexity, high-cost of production, low-frequency bandwidth, small fly-height or small weight control range and large operation voltages.

U.S. Pat. No. 4,605,977 (Matthews) discloses a flexible beam affixed to the slider providing a cantilever structure. A magnetic head is mounted on the free end of the cantilever. A pair of oppositely polarized piezoelectric crystals are mounted on the cantilever assembly. When energized by an electrical driving source, the cantilever beam is flexed upwards or downwards thereby changing the distance of the magnetic head from the disc.

U.S. Pat. No. 5,719,720 (Lee) describes use of piezoelectric strain effect to avoid or reduce the contact between the transducer head and surface of the disc drive. A head suspension mechanism having a unimorph piezoelectric layer is attached to a bottom surface portion of a resilient portion of a load beam, and a second layer of piezoelectric material is attached to a top surface portion of the resilient portion of the load beam, wherein a control signal induces a piezoelectric strain effect in the first layer of piezoelectric material to cause the load beam to raise the head slider from the surface of the disc in a start mode before the disc begins to rotate, and the second layer of piezoelectric material senses the strain and generates the corresponding signal to start rotation of the disc. The piezoelectric strain effect is also used to cause the load beam to keep the slider from contacting the surface of the disc until the disc comes to a complete stop.

U.S. Pat. No. 6,166,874 (Kim) further discloses an application of a microactuating scheme based on piezoelectric strain effect for actively adjusting the fly-height during the operation of the disc drive to compensate for displacements of the flying head caused by a minute impact or vibration.

Similar to the earlier proposals of using a piezoelectric microactuator to control fly-height (C. E. Yeack-Scranton, IEEE Trans Magn., MAG-22, and C. E. Yeack-Scranton, IEEE Trans Magn., MAG-26), the microactuating schemes used in the above two patents (U.S. Pat. No. 5,719,720 and U.S. Pat. No. 6,166,874) are based on piezoelectric strain actuators and thus have the same drawbacks.

Most importantly, microactuation found in the prior art usually does either or both of the following: 1) stabilizing a given average fly-height which is predetermined by the air bearing design and the gram load (with the gram load mechanically and permanently predetermined during manufacturing); and 2) temporarily lifting up a transducer head that is resting on the disc surface prior to the rotation of the disc in order to protect the transducer head and the disc surface. There is no provision in the prior art of a mechanism to achieve a desired average fly height using an electric control signal during the operation of the disc. More specifically, there is no provision in the prior art of a method adjusting the gram load on the suspension during the operation of the disc to achieve a desired average fly-height. There is further no provision in the prior art of a mechanism both achieving a desired average fly-height and stabilizing thereof during operation by preventing fluctuations. Furthermore, the piezoelectric microactuation mechanisms used in the prior art to stabilize fly-height tend to have drawbacks including processing difficulties, compatibility, structure complexity, high production costs, low-frequency bandwidth, small control range of fly-height or load weight, requirement of large operation voltages, and lack of an integrated microactuating scheme for both fly-height control radial tracking control.

BRIEF SUMMARY OF THE INVENTION

The present invention discloses a novel application of a microactuating mechanism in a suspension assembly to achieve a desired fly-height of the slider, especially a very low fly height, by using a microactuator to apply a desired amount of alteration gram load on a suspension load beam. The suspension load beam has a front end connecting to a slider assembly carrying a transducer head and has a rear end. The microactuator is placed on the suspension load beam for bending the suspension load beam at the front end during a sustained period of data read/write time and thus achieving a desired average fly-height which is different from an unaltered average fly-height which would have been achieved without the microactuator.

In one embodiment, the desired low fly-height is lower than the unaltered fly-height. The invention thus provides an effective way of achieving very low fly-height in a disc drive.

Bimorph piezoelectric microactuators are preferred and placed on the rear end of the load beam to bend the load beam. In one aspect of the invention, microactuation further has a sensor and a feedback circuit for dynamically adjusting the fly-height in the disc drive such that the fly-height remains constant at the desired fly-height. In another aspect of the invention, the microactuation further has the capability of laterally bending the suspension load beam thus laterally fine positioning the transducer head in addition to controlling the fly-height.

DETAILED DESCRIPTION

Figure 1:
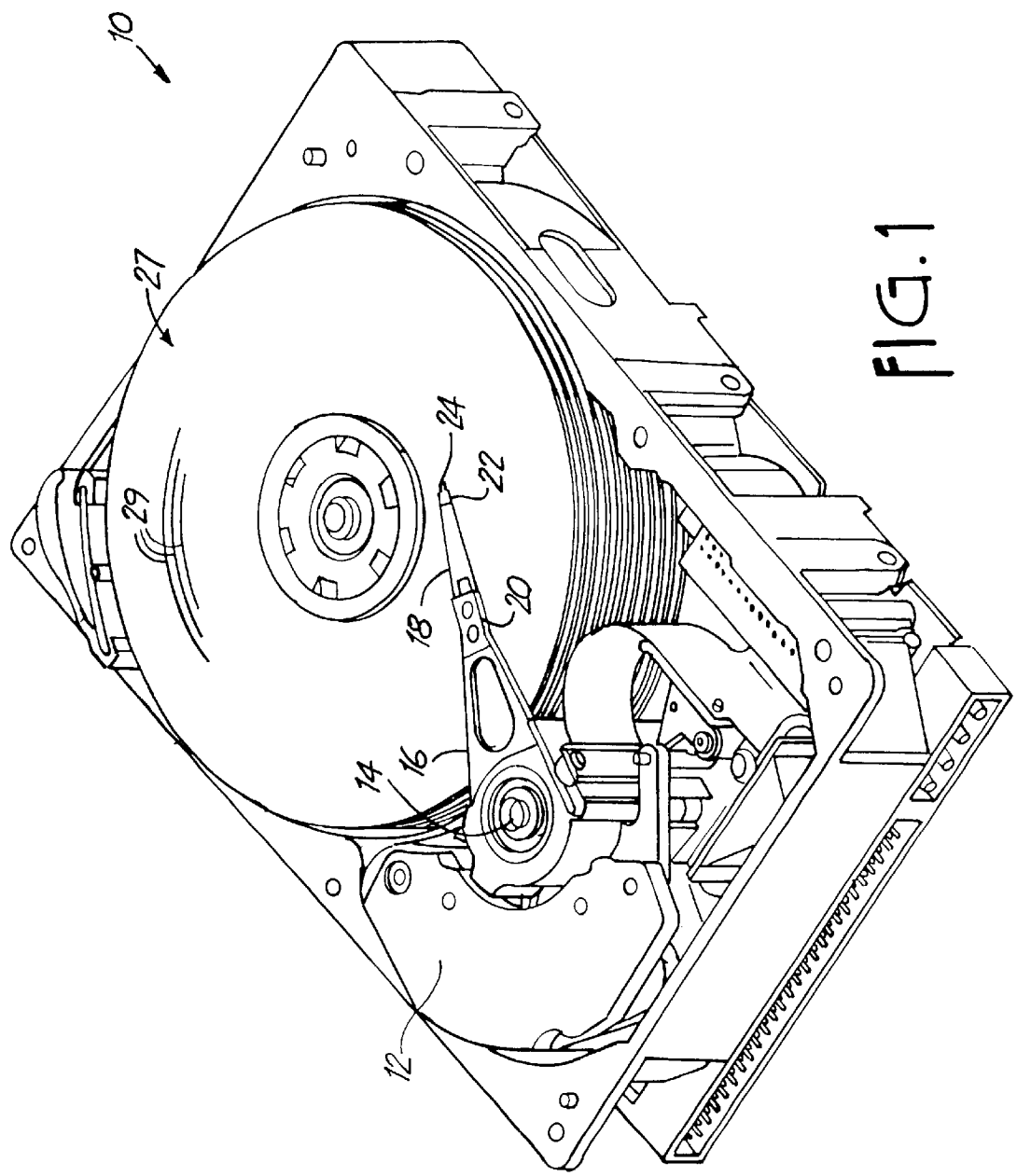
FIG. 1 is a perspective view of a disc drive including an actuation system for positioning a slider over tracks of a disc.

FIG. 1 is a perspective view of a prior art disc drive 10 which includes voice coil motor (VCM) 12 arranged to rotate actuator arm 16 on a spindle around axis 14. Head suspension load beam 18 is connected to actuator arm 16 at head mounting block 20. Flexure 22 is connected to an end of head suspension load beam 18, and carries slider 24. Slider 24 carries a transducing head (not shown in FIG. 1) for reading and/or writing data on disc 27, which rotates around axis 28 and includes concentric tracks 29 on which the data is written.

Figure 2A:
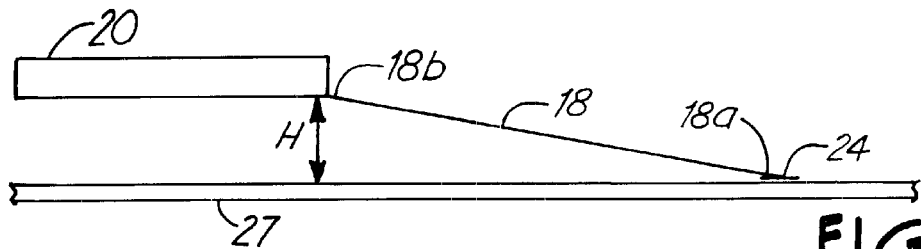
FIGS. 2A and 2B are schematic views of a prior art suspension assembly with an air bearing slider.
Figure 2B:
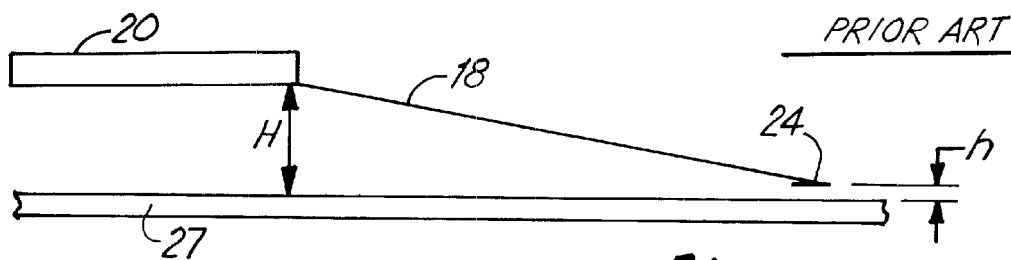

FIGS. 2A and 2B show more details of conventional suspension load beam 18. As shown in FIG. 2A, suspension load beam 18 has a front end 18a and a rear end 18b. The rear end 18b connects to the mounting block, and has a height H measured vertically from disc 27. When disc 27 is in a still condition (i.e., non-rotating), slider 24 usually rests on disc 27 due to a gram load applied on slider 24 through suspension load beam 18.

As shown in FIG. 2B, as disc 27 rotates, windage is encountered by slider 24 to keep it aloft a small distance h above the surface of disc 27 based on an air bearing mechanism. In this disclosure, the distance h is called the "fly-height" of the slider 24. Usually, fly-height h is determined by a combination of a number of factors including the design of air bearing surface, the gram load pre-loaded on slider 24 through suspension load beam 18, and the rotating speed of the disc.

The higher track density in the newer disc drives makes a smaller fly-height desirable. However, it has been a growing challenge to achieve a very small fly-height which is both predictable and stable. Due to various mechanical and thermal disturbances, the actual fly-height during the operation of the disc fluctuates around an average fly-height.

Conceptually, achieving a very small average fly-height and keeping the actual fly-height as close as possible to a constant are two related but different problems. In the past, much has been achieved in decreasing the average fly-height through designing novel air bearing mechanisms and adjusting the pre-gram load mechanically during manufacturing. However, this approach is reaching, or has already reached, its limits.

On the other hand, given an expected average fly-height (with a certain air bearing design, gram load, and rotating speed), various microactuation mechanisms have been applied as countermeasures to diminish fluctuations of the actual fly-height during disc operation in order to stabilize the fly-height.

The present invention provides a novel suspension assembly that utilizes an active microactuation mechanism to achieve and maintain a desired average fly-height. Furthermore, with the inventive method, a microactuation mechanism may be used to further stabilize the desired average fly-height in a conventional way.

1. Achieving a Desired Fly-height by Altering Gram Load during Rotation

Figure 3:
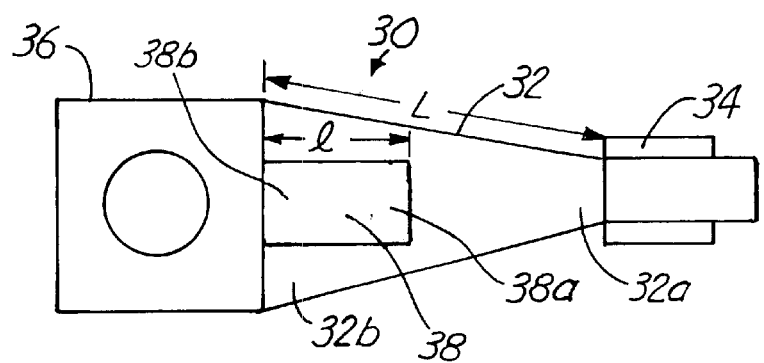
FIG. 3 is a top schematic view of a microactuated suspension assembly in accordance with the present invention.

FIG. 3 is a top schematic view of the actuating suspension assembly 30 in accordance with the present invention. The actuating suspension assembly 30 includes a resilient suspension load beam 32 (such as a prior art suspension load beam 18 in FIG. 1), slider 34 carried on front end 32a of suspension load beam 32, baseplate 36 connected to rear end 32b of suspension load beam 32, and microactuator 38 bonded on a side of suspension load beam 32. Suspension load beam 32 has a front end 32a and a rear end 32b, and a longitudinal length L measured between two ends 32a and 32b. Microactuator 38 has two ends 38a and 38b, and a longitudinal length 1 measured therebetween. The longitudinal length L of suspension load beam 32 is greater than the longitudinal length 1 of microactuator 38.

Slider 34 carries a transducer head (not shown) for reading/writing data from or to the disc. The baseplate 36 is a part of the mounting block 20 (FIG. 1) in a multi-disc configuration.

Figure 4A:
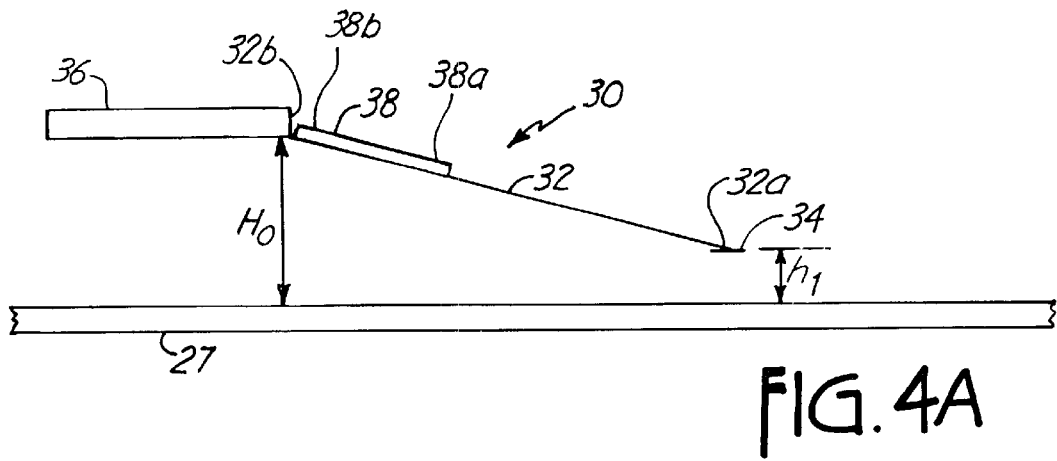
FIGS. 4A and 4B are schematic side views of the microactuated suspension assembly in accordance with the present invention, illustrating how the actuating suspension assembly works.
Figure 4B:
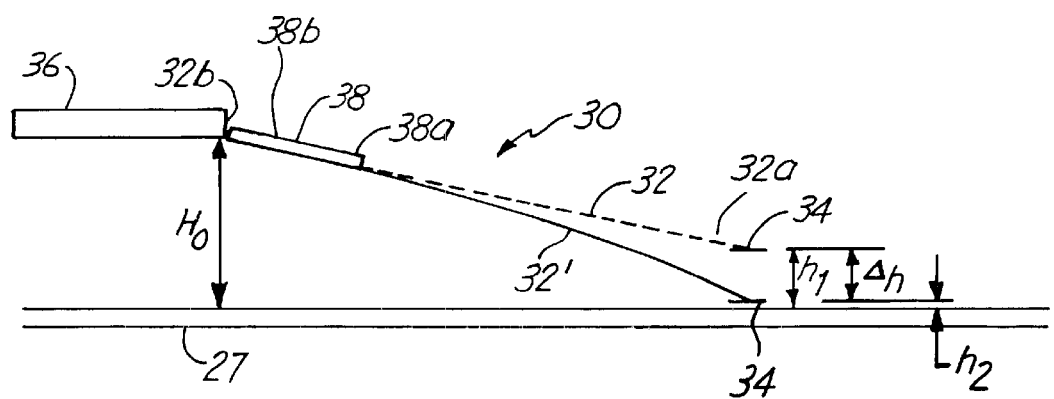

FIGS. 4A and 4B illustrate how the actuating suspension assembly 30 in FIG. 3 functions.

FIG. 4A is a schematic side sectional view of the actuating suspension assembly 30 in a condition where disc 27 is rotating but microactuator 38 has a zero output (i.e., causing no actuating effect). The end height of suspension load beam 32 is illustrated as $H_0$. Slider 34 has a fly-height $h_1$ (exaggerated in FIGS. 4A and 4B), which is the balance point determined by the balancing between the gram load pre-applied on the suspension load beam 32 and an elevating air bearing force exerted upon slider 34. In this disclosure, fly-height $h_1$ is called "unaltered fly-height".

FIG. 4B illustrates the actuating effect of microactuator 38 when it has a non-zero output force. Microactuator 38 exerts a downward bending force on suspension load beam 32 at its front end 32a (the bending mechanism of microactuator 38 is described in detail in later sections of the present disclosure with references to FIGS. 5A–10). The bending force exerted on suspension load beam 32 is equivalent to an extra gram load applied on slider 34 and thus breaks the initial balance between the gram load and the elevating air bearing force. As a result, suspension load beam 32 is bent from its initial status 32 to a new status 32', causing the front end 32a thereof and the slider 34 carried thereon to be lowered closer to disc 27. In a typical air bearing system, a closer distance between slider 34 and disc 27 leads to a greater elevating air bearing force to block the increased gram load on slider 34. As a result, a new balance is achieved on the slider 34 with a new fly-height $h_2$ which is smaller than $h_1$ by $\Delta h$.

As described above, a new fly-height $h_2$ is achieved by actively altering the gram load on the suspension load beam 18 using a microactuator during the operation of the disc drive 10. In this disclosure, new fly-height $h_2$ is also called "altered fly-height" or "desired fly-height" interchangeably. The extra gram load used to alter the original gram load is also called "alteration gram load". When other conditions are fixed, there exists a corresponding relationship between the amount of the alteration gram load applied and the altered fly-height $h_1$. Such relationship may be predicted theoretically but can be more reliably determined empirically. Under an ideal condition having no fluctuation, a constant alteration gram load maintained during a sustained period of reading/writing operation realizes a corresponding constant altered fly-height $h_2$.

In FIG. 4B, the altered fly-height $h_2$ is lower than the unaltered fly-height $h_1$ that would have been achieved without applying the alteration gram load through microactuator 38. However, it is also possible to achieve an altered fly-height $h_2$ which is greater than the unaltered fly-height $h_1$. This can be accomplished by applying a negative gram load (i.e., an upward force that decreases the gram load applied on the slider 24).

In addition to achieving a specific desired fly-height, microactuator 38 may be used for further controlling of transducer head and medium interaction. For example, it may be used to protect the disc and the transducer head in the following situations. Because a typical head in a disc drive is actually utilized only in a small percentage of the time when the disc drive is operating, there is a need for active fly-height control to reduce wearing on the head and the disc by avoiding or reducing the head-disc contact during rotation of the disc. As a related issue, most present slider assemblies use a positive loading mounting system which is configured to rest the slider upon the magnetic media disc when the disc is not turning, while allowing the slider to fly above the disc after it begins to turn. With positive loading, a slider is biased toward the disc and its air-bearing surface rides above the disc only after the viscous air currents are developed by rotation of the disc. A potential problem of positive loading is that the heads and slider may stick to the disc when it has stopped due to formation of a "vacuum" weld between the opposed precision flat surfaces of the slider and disc. The microactuating schemes in accordance with the present invention can be programmed to solve or alleviate the above-described problem. For example, a voltage can be applied to microactuator 38 to bend suspension load beam 32 and thus lift up the transducer head carried on slider 34 from the disc before the disc starts to rotate. For such a purpose, the magnitude of the signal does not have to be very specific or quantified as long as a force strong enough to break the vacuum stiction is generated. Procedures described in U.S. Pat. No. 5,719,720 (Lee) may be used. Once the disc has started to rotate, a signal to create a specific alteration gram load and to achieve a desired fly-height is then applied to microactuator 38.

In the particular embodiment shown in FIGS. 4A–4B, microactuator 38 is: 1) shorter than the load beam 32 itself; 2) placed on top of load beam 32; and 3) placed at or close to the rear end 32b of the load beam 32. However, none of these particular configurations is required for the purpose of altering load gram on slider 34. For example, microactuator 38 may have a length close to, equal to, or even longer than the length of load beam 32. In fact, microactuator 38 may substitute load beam 32 and act as both a load beam and microactuator at the same time. Microactuator 38 may also be placed at a bottom side of load beam 32. Microactuator 38 may also be placed close to front end 32a of load beam 32. Essentially, any configuration that can reliably alter gram load on slider 34 can be used.

To a certain degree, configuration of microactuator 38 and its placement in relation to load beam 32 is constrained by other considerations such as the force output, mechanical properties (such as flexibility and resilience, particularly in conjunction with air bearing effect) of the resultant load beam, the overall size and weight of the load beam/microactuator assembly. Considerations in choosing an optimal location for the bimorph in piezoelectric microactuator include the potential for bandwidth growth, the ease of integration into the mechanical platform, the overall ease and cost of assembly, and electrostatic discharge (ESD) prevention. One advantage of placing the microactuator 38 at or close to the rear end 32b of the load beam 32 and thus out of the gimbal/slider area is the simplicity of wiring. In practice, placing a microactuator in the gimbal/slider area requires routing additional electrical wires to power and control the microactuator. Such extra wiring in a small area is not only difficult to execute but also could interfere with free movement of the gimbal. By contrast, placing the microactuator on the suspension load beam is much easier to integrate in today's disc drives. The arrangement also avoids interfering with the operation of the head-gimbal assembly as well as the electrostatic discharge ESD sensitive magnetic read/write heads. It is therefore more practical to locate the microactuator out of the gimbal/slider area, especially when both flying and electrical characteristics of the head assembly are taken into account.

In general, microactuator 38 can be any type of a microactuator as long as it can effectively bend suspension load beam 32. However, there are many important functionality and performance considerations in choosing a suitable microactuator 38. These considerations include high bandwidth, high output force, compact size, bidirectional bendability, bending range and bending at only one end. Due to these considerations, it is preferred that microactuator 38 is a bimorph piezoelectric microactuator as described herein.

Piezoelectric microactuators work based on the fact that piezoelectric material deforms when an electric field is applied. Polarization is necessary to align the electric dipoles in the piezoelectric layers since, as formed, the electric dipoles in a piezoelectric layer are randomly oriented. When the piezoelectric material is polarized, piezoelectric coefficients can be written in matrix form to describe the directional relationships between an electric field applied wide in one direction and strain caused in another. By definition, when a field is applied across the thickness of a piezoelectric strip, the thickness direction is assigned the direction-3, with the direction-1 commonly given to the larger of the in-plane dimensions. In this case, strain in direction-1 (length) in response to the electric field applied in direction-3 (thickness) is represented by a matrix element $d_{31}$ having the units m/V. A piezoelectric microactuator that utilizes the strain in direction-1 caused by the electric field applied in direction 3 is called $d_{31}$ microactuator.

Specifically, in a $d_{31}$ microactuator, a strain S develops along a length of a piezoelectric layer as a result of the electric field applied in the thickness direction of the piezoelectric layer. When there is no external stress, strain S is described according to Equation (1):

$$S_1 = d_{31} E_3 \tag{1}$$

where $d_{31}$ is the piezoelectric coefficient and $E_3$ is the applied electric field in the thickness direction.

The most common material used for piezoelectric actuators is lead zirconate titanate, or PZT for short (Pb{Zr$_x$ Ti$_{1-x}$}O$_3$, where x is approximately equal to 0.54), formed between the solid solution of lead zirconate, PZ (PbZrO$_3$), and lead titanate, PT (PbTiO$_3$). A number of designated types of PZT are available commercially, each having a specified set of properties, achieved through varying the Zr/Ti ratio and by adding dopants (such as Nb, Mn, Sr or La). Alternatives to PZT, such as a solid solution between lead magnesium niobate, PMN (PbMg$_{,1/3}$ Nb$_{2/3}$ O$_3$) and PT (e.g. 0.1PT–0.9PMN), also exist. These alternatives have both advantages and disadvantages and are typically more expensive.

Figure 5A:
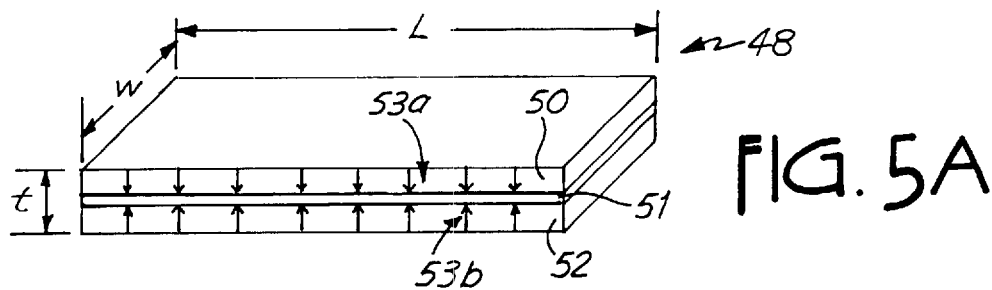
FIGS. 5A–5C illustrate an example of a $d_{31}$ piezoelectric serial bimorph microactuator used in the present invention.
Figure 5B:
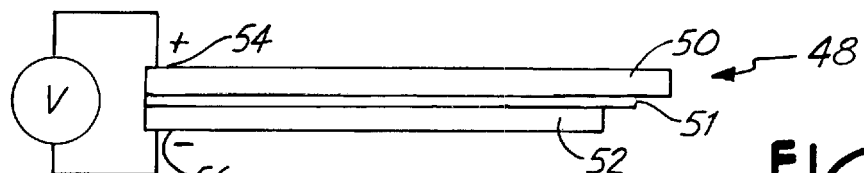
Figure 5C:
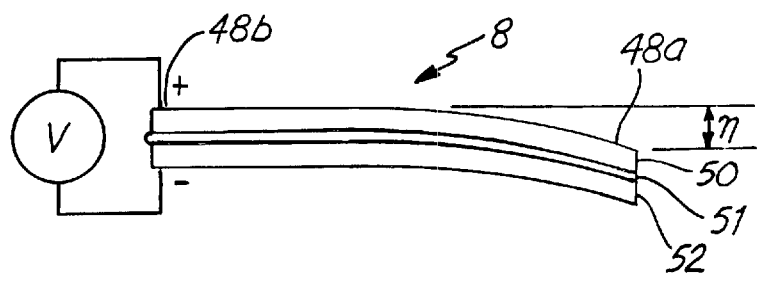

FIGS. 5A–5C illustrate an example of a piezoelectric serial bimorph microactuator 48 used in the present invention (in FIGS. 3, 4A and 4B). The microactuator 48 as shown has a first piezoelectric layer 50, a second piezoelectric layer 52, and an intermediate layer 51 sandwiched therebetween. Such piezoelectric bimorph microactuators are discussed in U.S. Pat. No. 6,118,637 (Wright et al.), which is hereby incorporated herein by reference.

As shown in FIG. 5A, each piezoelectric layer 50 or 52 has a length l, a width w, and a thickness t. Arrows 53a and 53b indicate the polarization directions, which were determined during processing of the piezoelectric materials. Two layers 50 and 52 are polarized in opposite directions. The polarization can be performed by connecting the center shim to ground and applying opposite fields to the respective layers.

FIG. 5B illustrates the effect of application of an electric field through electrodes 54 and 56. And the electric field applied as shown is in the opposite sense to the polarization direction in top layer 50. The electric field induces the top layer 50 to expand while inducing the oppositely polarized bottom layer 50 to contract. Since the two layers 50 and 52 are attached and do not strain appreciably in relation to each other, the bimorph cantilever beam 48 will bend as shown in FIG. 5C, causing a vertical deflection η at an end 48a of the beam 48.

Unlike piezoelectric microactuators based on simple strain effect (such as that found in U.S. Pat. No. 5,719,720 to Lee), bimorph piezoelectric microactuators as illustrated in FIGS. 5A–5C have bidirectional bendability. Specifically, a bimorph piezoelectric microactuator can cause the load beam to bend either upward or downward depending on the electric fields applied. In contrast, piezoelectric microactuators based on simple strain effect can cause the load beam to bend in only one direction depending on the configuration (e.g., upward direction only when the microactuator is placed on a top side of the load beam). Bidirectional bendability is advantageous in the applications of the present invention not only because it allows downward bending of the load beam when the microactuator is placed on the top side of the load beam and thus further away from the disc, but also because it provides with a single microactuator additional functionality such as temporarily lifting up the slider from the disc as described herein.

Bimorph piezoelectric microactuators have additional advantages. Some of the most important functional requirements that affect the design of a bimorph actuator are the bending displacement and output force. In the bimorph configuration shown in FIGS. 5A–5C, where there is no other external forces, the static vertical deflection η at the end of the beam is given by the following relation:

$$\eta = \left(\frac{3}{2}\right) d_{31} \left(\frac{l^2}{t}\right) E \quad (2a)$$

$$\text{or: } \eta = \left(\frac{3}{2}\right) d_{31} \left(\frac{l}{t}\right)^2 V \quad (2b)$$

where l is the length of the bimorph cantilever beam, t is the thickness (two layers plus center electrode), and V is the applied voltage (V=E$_3$t). In order to provide the required amount of bending in a low voltage actuator, thin layers of piezoelectric material should be used. When necessary, several bimorphs of the configuration shown in FIGS. 5A–5C can be connected in series to obtain a greater length l, as long as the resultant microactuator does not become too bulky.

The static vertical deflection η corresponds to a bending force or its equivalent blocking force $F_{b1}$ for the bimorph cantilever 48, which force is given as:

$$F_{b1} = \left(\frac{3}{8}\right)\left(\frac{d_{31}}{S_{11}^E}\right)\left(\frac{wt^2}{l}\right) E \quad (3a)$$

$$\text{or: } F_{b1} = \left(\frac{3}{8}\right)\left(\frac{d_{31}}{S_{11}^E}\right)\left(\frac{wt}{l}\right) V \quad (3b)$$

where $S_{11}$ is the mechanical compliance in the direction-1 (length l) under the constant electric field E, and l, w, and t are the dimensions of the cantilever. The bending force is the amount of force created by the bimorph piezoelectric effect to bend the cantilever beam 48. Its equivalent, blocking force $F_{b1}$, represents the amount of counter force required to block the bending of the bimorph cantilever beam 48 described herein, or the amount of resisting force the bimorph piezoelectric bending effect is able to overcome.

The piezoelectric effect results in small strains, typically less than 0.1%. Restricting the drive voltage to a low voltage (such as +/−10V or less) further limits the attainable piezoelectric strain (which translates to a desired bending displacement). The limit in the voltage necessitates the use of thin piezoelectric actuators (i.e., piezoelectric layers with a small thickness). The achievable strain is a function of the applied field E. As E is determined by E=volt/thickness, thin layers with small thicknesses provides an opportunity to apply a high field E with a relatively low voltage. The use of the film further has a significant mechanical advantage of giving rise to a wider bandwidth due to less mass needs to be moved.

On the other hand, the force output is also a function of the volume of the piezoelectric material. Trade-offs thus occur between actuation amount, size of the actuator and the operation voltage required.

As shown in equations 2b, and 3b, for a given voltage, an increase in microactuator length l increases the bending displacement and decreases the bending force. An increase in width w increases the force and has no effect on the bending displacement. An increase in thickness increases the force but decreases the bending displacement.

As shown in FIG. 5C, the static vertical deflection η is measured at the front-end 48a of microactuator 48. When bimorph microactuator 48 is used as microactuator 38 in FIG. 4B to bend suspension load beam, the actual amount fly-height alteration Δh, which is measured at the front-end 32a of suspension load beam 32, is not the same as, but directly related to the static vertical deflection η. Furthermore, because η (FIG. 5C) is a static deflection when no external forces exist at the deflecting end (48a in FIG.

5C), while Δh (FIG. 4B) is the actual displacement as a result of the balancing between an internal bending force and external forces such as air bearing force, the relation between Δh and η may not be a simple one solely determined by geometric factors. The precise relation between Δh and η is best to be empirically determined using modeling or experimentation. Even without the knowledge of the precise relation, however, a general trend is clear that a greater static deflection η leads to a greater fly-height alteration Δh (and correspondingly a greater alteration gram load applied on the slider).

Based on a conservative estimation, a −10 nm to 10 nm flying-height alteration or a corresponding alteration gram load can be obtained by applying a voltage much less than 3 volts using a bimorph microactuator 48 made of PZT ceramic thin layers with a thickness t<0.10 mm.

The force and stroke (vertical displacement) as described herein are specified under the quasi-static conditions, meaning that the microactuator is presumed to operate well below its first resonant mode. In a case where an application requires the microactuator to operate at high frequency, the dynamics of the microactuator may affect its force and vertical displacement output. For high-bandwidth applications, microactuator 38 (48 for example) is commonly designed so that the frequency $f_0$ of the first resonant mode is 3 times higher than the highest operating frequency for the application. Designing a microactuator in this manner allows the force and stroke performance to be independent of frequency within the operating conditions of the application. This is based on a general observation that a PZT bimorph can reach its nominal displacement in approximately ⅓ of the period of the resonant frequency with significant overshoot. In other words, the shortest rise time of a piezoelectric microactuator is $T_{min}=f_0/3$. For example, a piezoelectric microactuator with a 100 kHz resonant frequency can reach its nominal displacement within 3 ms.

The difference between the lowest and the highest operating frequency is also called the bandwidth of a microactuation system. The bandwidth is inherently limited by the frequency $f_0$ of the first resonant mode of the system. The frequency $f_0$ itself is determined by the mechanical and electrical properties of the entire disc drive system, such as mass and blocking force. Most notably, a higher blocking force typically translates to a higher frequency $f_0$, and hence a larger bandwidth. For this reason, using a bimorph piezoelectric microactuator in accordance with a preferred embodiment of the present invention results in a significant additional advantage as compared to prior art disclosures that use unimorph piezoelectric microactuators. Specifically, the bimorph piezoelectric microactuator as used in the present invention results in a significantly larger bandwidth due to its higher blocking force and smaller mass as compared to that of unimorph piezoelectric microactuators. The larger bandwidth, in turn, makes it possible to realize a very short seeking time and very fast disc operations.

In addition to serial bimorph microactuator 48 shown in FIGS. 5A–5C, other types of bimorph piezoelectric microactuators can also be used to bend suspension load beam 32.

Figure 6:
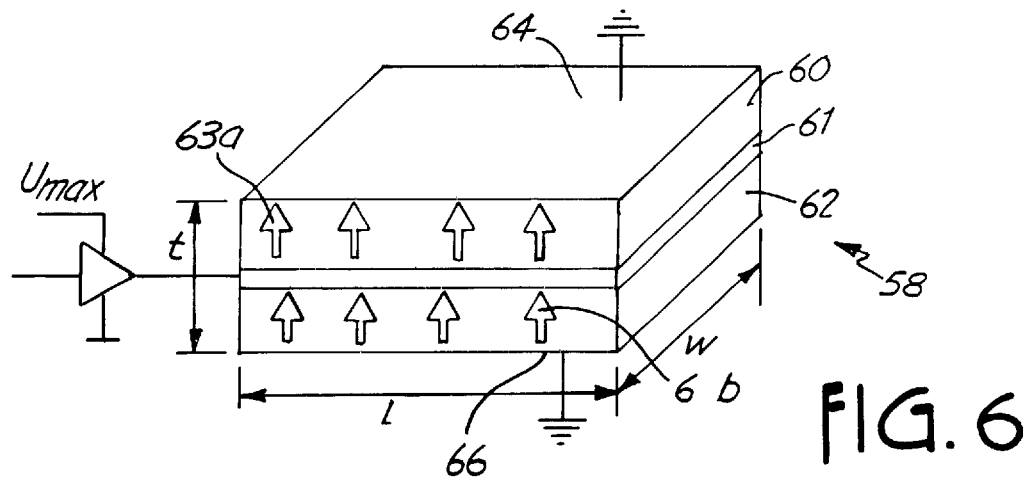
FIG. 6 illustrates an example of a $d_{31}$ piezoelectric parallel bimorph microactuator used in the present invention.

FIG. 6, for example, shows an alternative parallel bimorph microactuator 58. Similar to serial bimorph microactuator 48, parallel bimorph microactuator 58 has two piezoelectric layers 60 and 62 arranged on top of each other with an intermediate layer 61 sandwiched therebetween. However, piezoelectric layers 60 and 62 are polarized in the same direction as indicated by arrows 63a and 63b. Intermediate layer 61 functions as an electrode. Along with the electrodes 64 and 66 on the piezoelectric layers 60 and 62 respectively, parallel bimorph microactuator 58 thus has three electrodes as compared to two in serial bimorph microactuator 48, offering more alternative driving modes.

As shown in FIG. 6, electrodes 64 and 66 are used as ground (i.e., having a zero electric potential), while a voltage V being applied to the central electrode 61. In this configuration, although piezoelectric layers 60 and 62 are polarized in the same direction, they are driven in opposite directions because opposite voltages are applied on them in relation to their polarization. As a result, one layer contracts while the other expands, and thus the layers vertically bend microactuator 68.

In parallel bimorph microactuator 58, since central electrode 61 can be easily insulated in this configuration while the other two electrodes 64 and 66 are grounded, electrostatic discharge (ESD) problems are minimized. This particular arrangement of voltages on the electrodes (61, 64, and 66), although preferred, is not required. Other variations of the voltage arrangement may be used as long as sufficient amount of bending force output can be generated by microactuator 58.

2. Stabilizing the Desired Average Fly-height Using a Sensor and Feedback Circuit Due to the existence of various types of environmental fluctuations, the new fly-height achieved as described above can be maintained only in an average sense without a stabilizing mechanism. It is therefore an additional aspect of the present invention to include a method for stabilizing the desired fly-height during the rotation of the disc.

Any conventional means for stabilizing the fly-height may be used in conjunction with the present invention. It is preferred, however, that an integral microactuating scheme be used to both generate and stabilize a desired fly-height.

An example of such a scheme is to stabilize the fly-height by varying the alteration gram load around a base level (or an average level). As described above, under an ideal condition of no environmental fluctuation, a constant alteration gram load realizes a constant fly-height $h_2$. For a certain desired fly-height $h_2$, its corresponding constant alteration gram load under the ideal condition sets a base level for reference. When there are environmental fluctuations, the fly-height $h_2$ fluctuates around an average if the alteration gram load remains constant at the base level. However, instead of using a constant alteration gram load, the alteration gram load itself can be dynamically varied around the base level in response to the environmental fluctuations to correct the fluctuations and thus maintain a roughly constant fly-height during rotation of the disc.

In order for the correction to be done automatically, a sensor capable of sensing the fluctuations in the fly-height and a feedback circuit are necessary.

Figure 7:
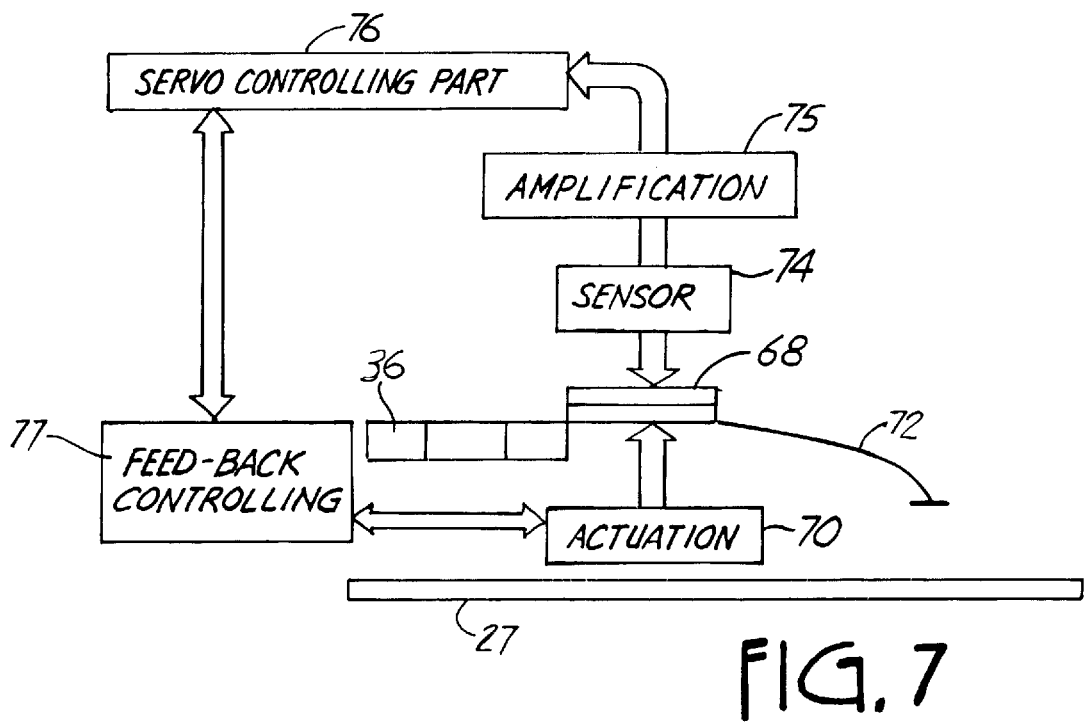
FIG. 7 is the schematic block diagram showing an exemplary scheme using the inventive microactuation further with a piezoelectric sensor and a feedback circuit loop to stabilize the fly-height.

FIG. 7 shows an exemplary system using piezoelectric microactuation which includes microactuator 68, actuation circuit 70, suspension load beam 72, sensor 74, amplification stage 75, servo control 76, and feedback control 77. In FIG. 7, an electric driving signal is provided to microactuator 68 through actuation circuit 70. Microactuator 68 bends suspension load beam 72 according to the driving signal provided to it to achieve an average desired fly-height $h_2$. Sensor 74 placed on suspension load beam 72 senses environmental fluctuations in the fly-height $h_2$. Sensor 74 generates an electric sensor signal in response to the fluctuation sensed. The electric sensor signal is received and amplified at amplification stage 75, processed by servo control circuit 76. The processed signal is then sent to feedback control circuit 77, and subsequently applied on microactuator 68 through actuation circuit 70 to correct an undesired fluctuation of suspension load beam 72.

Various sensor techniques can be used for sensor 74. The piezoelectric effect is ideal for the purpose of sensing fluctuations in the fly-height. In a disc drive which has a substantially fixed end height $H_0$ (FIGS. 4A–4B), fluctuations in the fly-height translates to mechanical distortions in the suspension load beam. Because the piezoelectric effect is essentially a dual effect in which the bending elements can also be used as a sensor that generates electric signals in response to distortions experienced by the element, a piezoelectric sensor can readily sense fluctuations in the fly-height.

For example, a piezoelectric sensor may include a layer of piezoelectric material with an electrode built thereon, wherein the layer of piezoelectric material is either directly or indirectly connected to suspension load beam 72 in order to sense the distortion thereof. Such a piezoelectric layer may be either separate from or an integral part of microactuator 68, but preferably is the latter. An exemplary microactuator having an integral sensor is described in detail in the next section of this disclosure with reference to FIG. 10.

As previously described, where there are no fluctuations caused by thermal or mechanical disturbances, suspension load beam 72 maintains a certain degree of distortion (bending) with a constant driving signal. Such a distortion may be called an "expected distortion" for a given desired fly-height. When there is fluctuation in fly-height, the fluctuation causes the distortion on load beam 72 to deviate from the "expected distortion". In the present invention, only deviations from the "expected distortion" needs to be corrected. The "expected distortion" itself is needed to realize a desired fly-height and therefore should remain uncorrected. To avoid sensor and feedback circuit from reacting to an "expected distortion", the circuitry in the feedback loop may be designed and calibrated such that no feedback signal is applied to microactuator 68 when the suspension load beam 72 has an expected or normal distortion, while a feedback signal proportional to the deviation is applied to microactuator 68 when the suspension load beam 72 has a distortion that deviates from the expected distortion.

3. Optional Tracking Control

Assembly 30 (FIGS. 4A and 4B) in accordance with the present invention may further include microactuating means for fine control of track pitch. This requires a microactuator that can additionally move transducer head 34 laterally. Any microactuator for laterally moving a transducer head in disc drive may be used in combination of microactuator 38 of the present invention. Such a microactuator can be one that is implemented at the suspension arm level, placed in the gimbal area, or operates directly at the slider level.

Figure 8:
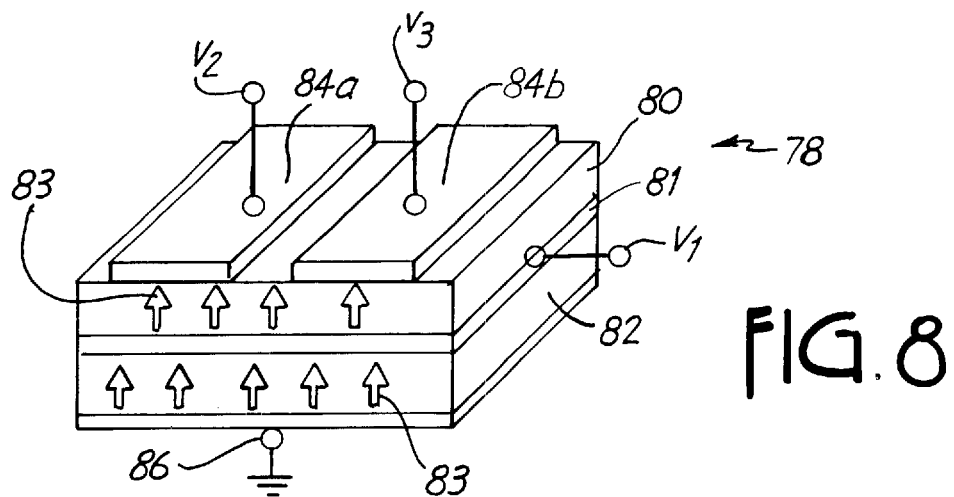
FIG. 8 shows a unique parallel bimorph piezoelectric microactuator that can perform both vertical bending and lateral bending of the suspension load beam.

FIG. 8 shows a unique parallel bimorph microactuator 78 that can integrally perform both vertical bending and lateral bending of the suspension load beam 32 (FIGS. 4A and 4B).

Similar to the parallel bimorph microactuator 58 shown in FIG. 6, parallel bimorph microactuator 78 in FIG. 8 has two piezoelectric layers 80 and 82 arranged on top of each other with an intermediate electrode 81 sandwiched therebetween, a bottom electrode 86 on the bottom piezoelectric layer 82. However, unlike microactuator 58 in FIG. 6 which has a single electrode 64 of its top layer 60, microactuator 78 has two separate electrodes 84a and 84b on the top layer 80.

Piezoelectric layers 80 and 82 are polarized in the same direction as indicated by arrows 83. Electrode 86 on the bottom layer 82 is used as a ground (i.e., with a zero voltage), central electrode 81 is given a voltage $V_1$, and two separate top electrodes 84a and 84b are given two different voltages $V_2$ and $V_3$ respectively.

Under the above conditions, microactuator 78, in addition to being an out-plane bimorph microactuator bendable vertically like previously described microactuators 48 and 58, behaves like an in-plane bimorph microactuator that can bend laterally. The out-plane vertical bending of microactuator 78 is based on a similar mechanism to that of microactuator 58 as explained with reference to FIG. 6. Specifically, when $V_1$ is different from either or both of $V_2$ and $V_3$, top layer 80 and bottom layer 82 contract or expand in opposite directions, causing microactuator 78 to bend vertically. The in-plane lateral bending of microactuator 78 is explained as follows.

Figure 9A:
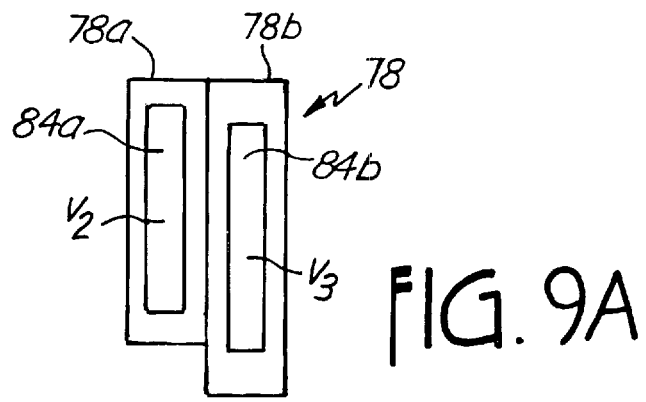
FIGS. 9A and 9B are schematic top views of the microactuator in FIG. 8 illustrating its lateral bending mechanism.
Figure 9B:
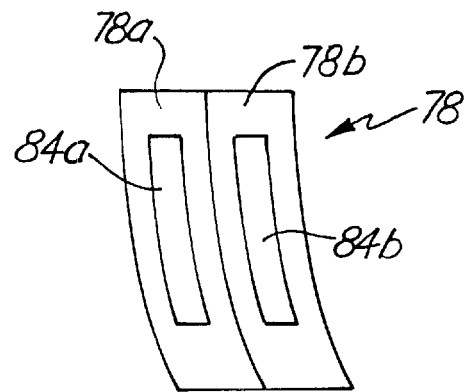

FIGS. 9A and 9B show a schematic top view of microactuator 78 in FIG. 8. Microactuator 78 has two halves 78a and 78b corresponding to the two separate top electrodes 84a and 84b. Voltages $V_2$ and $V_3$ are applied to top electrodes 84a and 84b respectively. Because $V_2$ and $V_3$ are different from each other, two halves 78a and 78b experience a differential expansion (or contraction) as illustrated in FIG. 9A. For example, if $V_2=V_1$ while $V_3<V_1$, half 78a does not expand or contract while half 78b expands. When two halves 78a and 78b are connected in a way that no appreciable relative movement is allowed therebetween, microactuator 78 bends laterally as illustrated in FIG. 9B.

The two halves 78a and 78b may be formed separately and subsequently combined together to form microactuator 78. Preferably, however, they are formed integrally from a single substrate or in the same thin film deposition process with proper insulation provided therebetween. In fact, since piezoelectric materials, such as PZT, are essentially nonconductive and allow no appreciable electron migration therein, there is no need to have any separation between the two halves 78a and 78b except between the two top electrodes 84a and 84b. That is, the piezoelectric part of the entire top layer 80 and bottom layer 82 in microactuator 78 can each be a single piece of the material, with the top two electrodes 84a and 84b deposited or patterned in two different regions on the top layer 80 such that the electrodes 84a and 84b themselves are electrically isolated and do not inference with each other. As different voltages ($V_1$, $V_2$ and $V_3$) are applied to electrodes 81, 84a and 84b in the bimorph microactuator 78, piezoelectric materials in different regions corresponding to different electrodes have different mechanical responses based on the piezoelectric effect. As the voltages are positionally differentiated, the displacement (expansion or contraction) of the piezoelectric materials is also positionally differentiated, resulting in the desired bidirectional bending effect as described above.

In microactuator 78, the particular differential voltages scheme ($V_1$, $V_2$ and $V_3$) shown in FIGS. 8–9B is only exemplary. Various differential voltage schemes may be used to obtain different effects. In addition, the parallel bimorph arrangement (i.e., similar to microactuator 58 which has two piezoelectric players polarized in the same direction sandwiching a central electrode) is also for the purpose of illustration only. The same principle used in microactuator 78 as described above can also be applied in a serial bimorph microactuator (such as one similar to microactuator 48) to obtain a similar bidirectional bending effect.

The novel parallel bimorph microactuator as disclosed above may also be used for purposes other than bending a suspension load beam. In fact, microactuator 78 can essentially be used in many schemes of bidirectional actuation.

Figure 10:
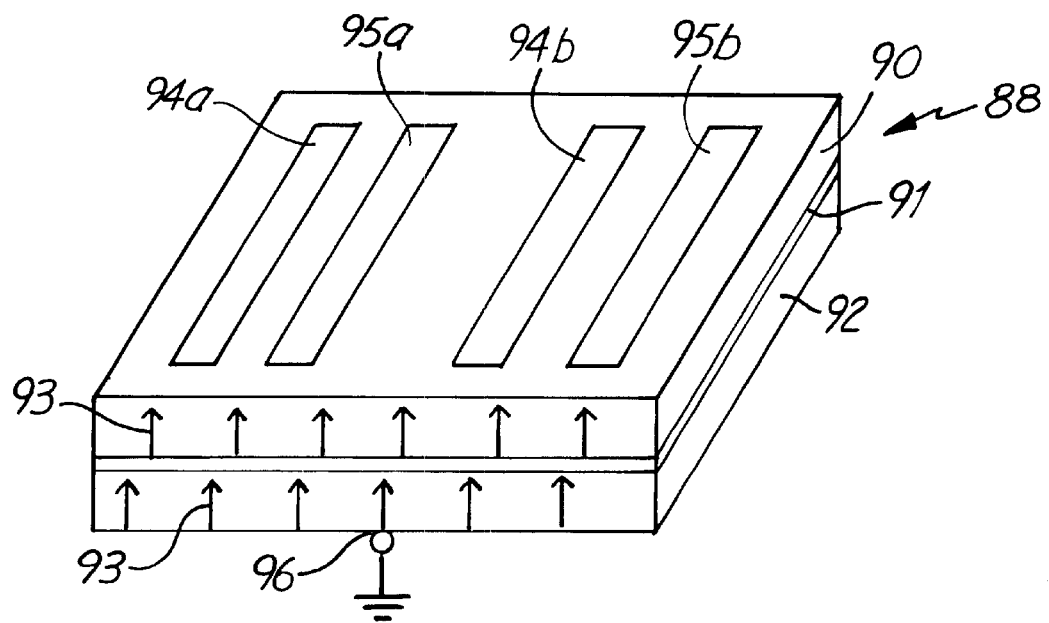
FIG. 10 is a schematic view of a parallel bimorph piezoelectric microactuator that can perform both vertical bending and lateral bending of the suspension load beam and additionally has a built-in sensor to sense distortions.

Tracking control can be further combined with the previously-described method for stabilizing the desired average fly-height using a sensor and a feedback circuit. Parallel bimorph microactuator 78, for example, can be used as a platform to host a sensor for the purpose of stabilizing the desired average fly-height. As shown in FIG. 10, parallel bimorph microactuator 88 is essentially microactuator 78 added with two electrodes 95a and 95b to facilitate a piezoelectric sensing function. Together with electrodes 94a and 94b used for microactuation, microactuator 88 has four electrodes on top piezoelectric layer 90. As microactuator 88 is bonded on the suspension load beam (e.g, as microactuator 38 illustrated in FIGS. 4A and 4B), it both activates the suspension load beam and reciprocally generates electric signals in response to the distortions of the suspension load beam. Responsive electric signals are picked up by electrodes 95a and 95b and sent to a feedback circuit as described in FIG. 7. With this configuration, no separate sensor is required because piezoelectric layer 90 in microactuator 88 itself functions as a sensor.

Although microactuator 88 in FIG. 10 includes two electrodes 95a and 95b, it may have any suitable number of electrodes for the sensor. For example, it may have only one electrode 95a or 95b to facilitate the sensing function. In addition, the particular spacial arrangement of the four electrodes 94a, 94b, 95a and 95b is only exemplary and any other arrangement may be used as long as microactuating and sensing functions are made possible.

4. Summary

The invention provides more controllability and predictability than conventional mechanical gram load adjustment made during manufacturing. The inventive method can be used together with any air bearing mechanism and manufacturing mechanical gram load adjustment method to achieve an average fly-height that is different from the unaltered average fly-height which would have been obtained without gram load alteration by microactuation. Particularly, the inventive method is used to achieve an average fly-height that is smaller than the unaltered average fly-height.

The use of gram load alteration through bending the load beam during disc operation using a microactuator helps to achieve a very low fly-height. The use of a bimorph piezoelectric microactuator results in low driving voltages required to operate the microactuator. The choice of placing the microactuator on the suspension load beam avoids complexity of wiring and interference with the gimbal and transducer head. The actuating suspension assembly also has advantages of low production costs, easy assembly, direct controlling of fly-height and fly-load with a large adjustable range, and suitability for high-volume production. Additionally, the design of the microactuation mechanism according to the invention provides a convenient and effective way of combining microactuation in both vertical and lateral directions.

The amount of gram load alteration may be further finely and dynamically adjusted in order to eliminate random fluctuations in the fly-height during operation of disc drive 10.

It is important to note that, although the amount of gram load alteration may be further finely adjusted in order to eliminate random fluctuations in the fly-height during operation of disc drive 10 as described herein, the present invention's basic concept of applying an alteration gram load through a microactuator to alter fly-height is independent from, and not based on, the concept of eliminating fluctuation in the fly-height. Specifically, even where there is no fluctuation in the fly-height, a constant non-zero extra gram load is applied to achieve a desired fly-height during at least a sustained period of time when reading/writing is being performed. Where there are random fluctuations in the fly-height, the actuating suspension assembly according to the present invention may, but is not required to, be further adapted to include stabilizing microactuation means to eliminate the fluctuation. Such stabilizing microactuation means may be an integral part of the microactuator or based on a separate microactuator.

Furthermore, the invention can be combined with other features of microactuation as described herein. For example, the use a bimorph piezoelectric microactuator in accordance with a preferred embodiment of the present invention results in a significant additional advantage as compared to prior art disclosures that use unimorph piezoelectric microactuators. Specifically, the bimorph piezoelectric microactuator as used in the present invention results in a significantly larger bandwidth and makes it possible to realize a very short seeking time and very fast disc operations.

Although the present invention has been described with reference to preferred embodiments, workers skilled in the art will recognize that changes may be made in form and detail without departing from the spirit and scope of the invention.

What is claimed is:

1. An actuating suspension assembly used for a disc drive having a rotating disc, the assembly comprising:
   a suspension load beam having a front end connecting to a slider assembly carrying a transducer head and having a rear end; and
   a parallel bimorph piezoelectric microactuator placed on the suspension load beam for bending the suspension load beam at the front end during a sustained period of data read/write time to achieve a desired average fly-height which is different from an unaltered average fly-height which would have been achieved without operation of the microactuator.

2. The assembly of claim 1, wherein the desired average fly-height is lower than the unaltered average fly-height.

3. The assembly of claim 1, wherein the assembly is used during a disc rotation period in which the disc rotates continuously, and the microactuator bends the suspension load beam and maintains the desired average fly-height substantially during the entire disc rotation period.

4. The assembly of claim 1, wherein the microactuator does not vertically bend the suspension load beam at the rear end thereof.

5. The assembly of claim 1, wherein the microactuator is placed on a topside of the suspension load beam.

6. The assembly of claim 1, wherein the microactuator is placed close to the rear end of the load beam.

7. The assembly of claim 1, wherein the load beam connects to the slider assembly via a gimbal and the microactuator is placed as far as possible away from the gimbal.

8. The assembly of claim 1, wherein the microactuator is a $d_{31}$ piezoelectric microactuator.

9. The assembly of claim 1, further comprising:
   a sensor to sense a change of fly-height during a disc rotation period; and
   a feedback circuit to send a signal to the microactuator to adjust the fly-height as a function of the sensed change of fly-height.

10. The assembly of claim 9, wherein the sensor is piezoelectric and senses a distortion of the suspension load beam caused by the change of fly-height.

11. The assembly of claim 10, wherein the piezoelectric sensor is an integral part of the microactuator.

12. The assembly of claim 1, further comprising:
   microactuation means placed on the suspension load beam for laterally fine positioning the transducer head by laterally bending the suspension load beam.

13. The assembly of claim 11, wherein microactuation means is an integral part of the microactuator.

14. An actuating suspension assembly used for a disc drive having a rotating disc, comprising:
  a suspension load beam having a front end connecting to a slider assembly carrying a transducer head, a rear end and a longitudinal length measured from the rear end to the front end; and
  a parallel bimorph piezoelectric microactuator having bidirectional bendability placed on the suspension load beam, the parallel bimorph piezoelectric microactuator having a longitudinal length substantially shorter than the longitudinal length of the suspension load beam, being capable of bending the suspension load beam at the front end without bending the suspension load beam at the rear end thus facilitating adjustment of fly-height of the transducing head.

15. The assembly of claim 14, wherein the parallel bimorph piezoelectric microactuator bends the front end of the suspension load beam vertically downward during a disc rotation period to achieve a low fly-height which is lower than an unaltered average fly-height which would have been achieved without the parallel bimorph piezoelectric microactuator.

16. The assembly of claim 15, further comprising:
  a sensor which senses a change of fly-height during a disc rotation period; and
  a feedback circuit to send a signal to the parallel bimorph piezoelectric microactuator to adjust the fly-height in response to the sensor such that the fly-height remains substantially constant at the desired average fly-height during the disc rotation period.

17. The assembly of claim 14, wherein the microactuator is a $d_{31}$ piezoelectric microactuator.

18. The assembly of claim 17, wherein the parallel bimorph piezoelectric microactuator is placed on a topside of the suspension load beam, the topside facing away from the disc.

19. The assembly of claim 14, further comprising:
  microactuation means placed on the suspension load beam for laterally fine positioning the transducer head by laterally bending the suspension load beam.

20. The assembly of claim 19, wherein microactuation means for lateral positioning is an integral part of the microactuator.

* * * * *